Sept. 26, 1933.  T. F. BRENNAN  1,928,306
COLLAPSIBLE BULLET SHIELD STRUCTURE FOR AUTOMOBILES
Filed Feb. 10, 1933
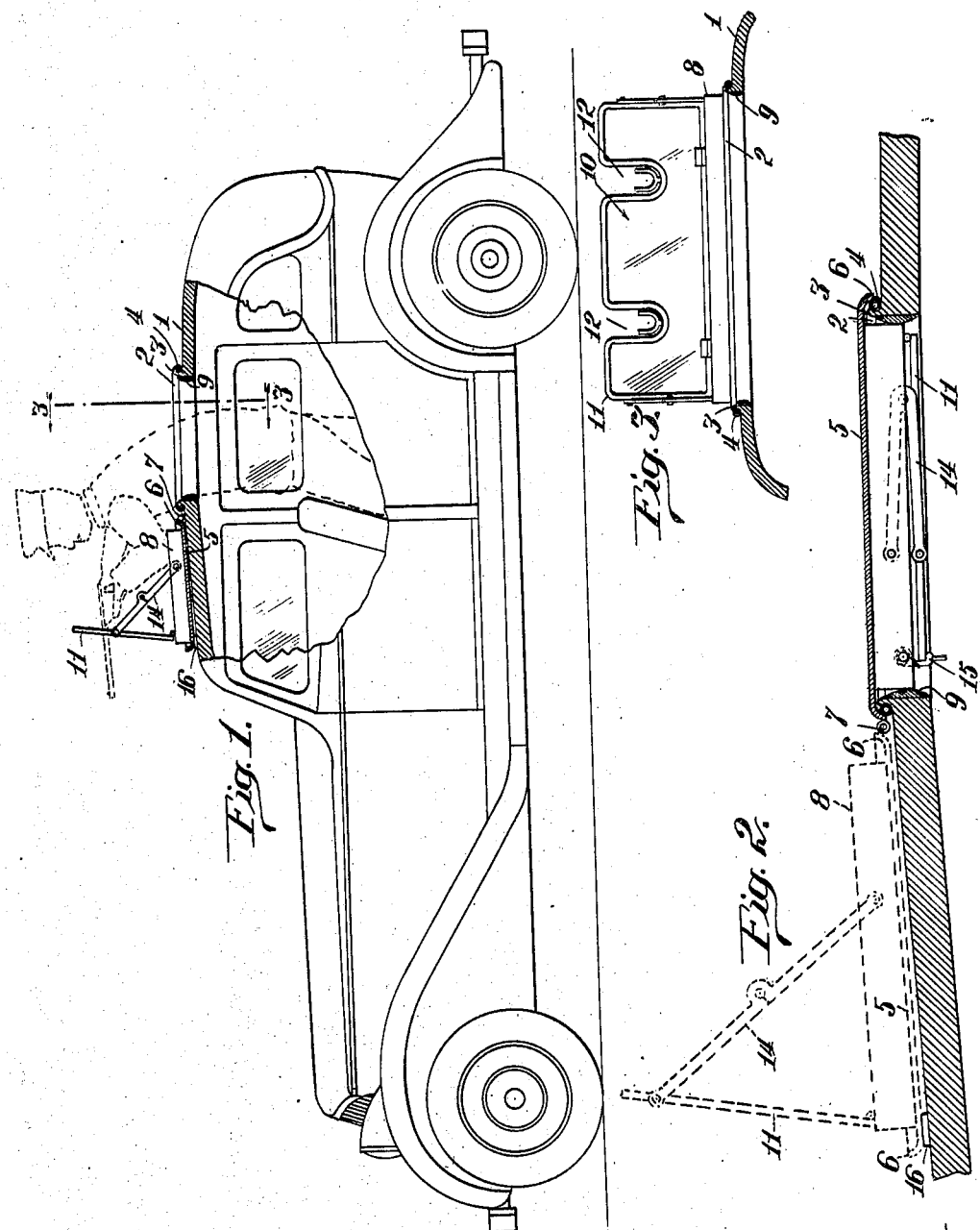
Inventor
Thomas F. Brennan
By Rudolph M. Lotz
Attorney Patented Sept. 26, 1933

1,928,

UNITED STATES PATENT OFFICE 1,928,306

COLLAPSIBLE BULLET SHIELD STRUCTURE FOR AUTOMOBILES

Thomas F. Brennan, Chicago, Ill.

Application February 10, 1933. Serial No. 656,106

7 Claims. (Cl. 89—36)

The invention has for its object to provide means adapted for use in the type of cars used by police squads whereby occupants of the car may project their heads, chests and arms through an aperture in the roof of the body for purposes of observation and for gun firing purposes when giving chase to other cars, while such occupants are protected as to head and chest, at least, from bullets fired from car which is being pursued. More particularly, the invention has for its main object to provide a trap door in the roof of the car, which is equipped with a collapsible bullet proof shield which may be disposed in a substantially upright position when said trap door is open, to afford protection to the head and shoulders of an officer who projects head, chest and arms through the aperture controlled by said trap door.

Other and more specific objects of the invention will be fully understood from the following specifications:

In the accompanying drawing illustrating a suitable embodiment of the invention, Fig. 1 is a side elevation, partly in section, of an automobile equipped with a trap door and shield constructed in accordance with the invention.

Fig. 2 is a fragmentary, vertical, longitudinal view on an enlarged scale of the roof of the car body, showing the trap door and shield structure in detail.

Fig. 3 is a rear elevation of the shield of the device, a part of the roof of the car body being shown in transverse section on the line 3—3 of Fig. 1.

In the squad cars used by police in large cities, the occupants, who are intended to keep close watch along both sides of a street or thoroughfare, along which the car is travelling, to note suspicious characters and happenings, are at a very appreciable disadvantage by reason of the fact that many cars are frequently parked along the curb of the street and hide from view the pedestrians and others who may be lurking along such street, and are further hampered in such observation by reason of the fact that their bodies are disposed, not in a position to enable them to look ahead easily, but such as to force craning of the necks for observation through the side windows or apertures in the car body.

These bodies of cars are usually comparatively low so that occupants may sit comfortably and have appreciable head room, but may not stand up in the same, whereas if such occupant could remain upright in the car and make observations over the tops of the parked cars, they wou at an appreciable advantage.

In pursuing bandit cars and firing shc such cars, the occupants of the pursuing ca also at an advantage if the shots can be from a higher elevation and also such firing be effected with less danger to other car: pedestrians, for the reason that the bullets \ miss the pursued car might imbed them: in the pavement, but ricocheting from the ment might damage the car being pursued very appreciable extent, but without grave d: to other cars and pedestrians. Likewise, pur bandit cars, the pursuers whose point of \ is disposed appreciably higher than the to intervening cars are at a greater advanta keeping track of the movements of the cars pursued.

Having all of these advantages of elevati mind, my invention resides broadly in prov in the roof or top (1) of a car body, an ape (2) which is preferably rectangular and is width sufficient to accommodate the upper tions of the bodies of two officers standing right upon the floor of the car body or upon able supports disposed upon such floor, a: case may be, and the height of certain of may dictate.

The said aperture (1) is preferably bor( by a combing (3) and the latter in turn is vided externally with a peripheral groove t ceive a suitable packing element such as a ber tube (4) held in place by its tension an( concavity of said groove.

A trap door (5) of suitable material whi provided with a peripheral flange (6) for gagement with the packing element (5) is otally secured to the car top (1) by means o hinge (7) extending transversely of said roo in front of the combing (3) at the forward of the aperture (2).

The said trap door (5) is also provided erably with flanges (8) disposed inwardly froi side portions of the peripheral flange (6) which engages the padding strip (9) lining aperture (2) and which constitutes a secon weatherproofing and also a padding ag: which the bodies of the upright officers may e lean with comfort.

Pivotally secured to the said flanges (8) jacent one end thereof, and adjacent the ( edges of the same, is a shield (10) which be composed of any suitable bullet-proof n rial, such as bullet-proof glass, enclosed in framing (11) or of metal of suitable type.

ld (10) is preferably of such height as to pro-
all, or the main portion of the head and all
he chest and arms of an officer standing up-
it in the car, with upper part of body pro-
ed through said aperture.

aid shield is provided, preferably, with a pair
ecesses (12) extending downwardly from the
er edge thereof, between its side edges and in
bottom of which suitable U-shaped swivelled
rests are mounted.

he said shield (10) is supported in its up-
it position substantially as shown in Figs. 1
2, by means of the foldable braces (14) of
suitable type which may be collapsed pre-
atory to lowering said shield, when it is desired
lose the trap-door (5). In order to prevent
shield from dropping from the position shown
Fig. 2 when said trap-door is closed, the said
ges (8) of the trap-door are equipped with
ng latch members (15) of suitable construc-
t for engaging the upper edge portions of said
ld when the latter is collapsed.

he foregoing construction possesses the ad-
tages enumerated hereinbefore, and is capa-
of appreciable modification and variation
hout departing from the invention as defined
he appended claims.

; will be obvious that when the trap-door is
ed and the peripheral flange (6) thereof part-
ompresses the packing (4), that a weather-
ofing joint is provided for the prevention of
tage of rain into the interior of the car.

; will be noted that the position of the aper-
(2) is such that its front wall is disposed
htly rearwardly of the vertical plate of the
rmost portion of the back of the front seat
he car, and that when the trap door is open
ffords a rest or support for the elbows of the
ers, if desired.

supporting means (16) is provided upon the
f of the car for the support of the foremost
tion of the trap-door when the latter is open,
shown in Figs. 1 and 2 and this means (16)
y be of any desired height in order to increase
elevation of the shield (10) and its angle of
ination, if desired.

claim as my invention:

A car-body having an aperture in its roof,
osure member for said aperture pivotally se-
ed to said roof along one wall of said aperture,
a shield mounted upon said closure member,
l shield being disposed within said car body
n said aperture is closed.

A car body having an aperture in its roof a
ure member for said aperture hinged to said
adjacent the front wall of said aperture and
rtible to lie upon said roof when open, and
ield pivotally secured to said closure member
adapted to be disposed in upright position
n said closure member is in its inverted posi-
-

A car body having an aperture in its roof,
losure member for said aperture hinged to
said roof adjacent the front wall of said aperture
and invertible to lie upon said roof when open,
and a collapsible shield foldable upon the under-
side of said closure member and arranged to be
supported in upright position when said closure
member is disposed in said inverted position.

4. A car body having an aperture in its roof,
a closure member for said aperture hinged to said
roof adjacent the front wall of said aperture and
invertible to lie upon said roof when open, to af-
ford an elbow rest, a shield pivotally secured to
the said closure member adjacent the edge there-
of opposite its hinged edge portion and foldable
to a position opposed and parallel to the under-
side of said closure member when the latter is in
closing position, and collapsible braces for sup-
porting said shield in upright position when said
closure member is disposed in said inverted posi-
tion.

5. A car body provided in its roof with an aper-
ture of dimensions sufficient to admit passage of
the head and chest of an occupant, a closure
member for said aperture hinged to the said roof
adjacent the front wall of the said aperture and
invertible to constitute an elbow rest for an up-
right occupant of the car body, a bullet shield
mounted upon said closure member and arranged
to be disposed in upright position along the for-
ward edge portion of the latter when the same
is disposed in the said inverted position.

6. A car-body provided in its roof with an aper-
ture of dimensions sufficient to admit the passage
of the head and chest of an occupant, a closure
member for said aperture hinged to the said roof
adjacent the front wall of the said aperture and
invertible to constitute an elbow rest for an up-
right occupant of the car body, a bullet shield
mounted upon said closure member and arranged
to be disposed in upright position along the for-
ward edge portion of the latter when the same is
disposed in the said inverted position and collap-
sible braces secured to said closure member and
said shield for supporting the latter in said up-
right position.

7. A car body provided in its roof with an aper-
ture through which the head and chest of an
occupant may pass, a combing bordering the said
aperture, a hinged closure member for the said
opening having a peripheral flange overhanging
said combing when said aperture is closed there-
by, flexible packing interposed between said
combing and said flange for providing a weather-
tight joint between said flange and said comb-
ing, said closure member being invertible to
lie forward of said aperture and constitute an el-
bow support for an upright occupant of the car
body, a shield pivotally secured to said closure
member and movable from upright position to a
position substantially parallel with and contigu-
ous to the under face of said closure member and
disposed along the forward edge of the latter
when the same is inverted.

THOMAS F. BRENNAN.